Dec. 30, 1969   J. SENICK   3,486,188
CRAB CRACKING AND CUTTING DEVICE
Filed Feb. 16, 1968

INVENTOR.
John Senick

3,486,188
CRAB CRACKING AND CUTTING DEVICE
John Senick, 2541 S. Galloway St.,
Philadelphia, Pa. 19148
Filed Feb. 16, 1968, Ser. No. 706,074
Int. Cl. A22c 29/00; A23n 5/04; A47i 43/26
U.S. Cl. 17—71                         3 Claims

ABSTRACT OF THE DISCLOSURE

A device for cracking and cutting crabs and lobsters having a knurled topped base for holding the crab or lobster in place with a pivotable member having a cutting blade in alignment with a plurality of teeth, the teeth serving to crack the shell of the seafood while the blade is used to cut with. A handle portion of the bar is also in alignment with the cracking portion and the cutting blade of the device and extends from one end of the base of the device. This device serves to easily crack, cut and quarter crabs and may be also used to remove the tail from a lobster while the blade portion is used to lay open the tail in order to extract the meat easily.

---

This invention relates to cutting and shelling devices, and more particularly to a device for easily removing the meat from seafood, such as crabs and lobsters.

It is therefore the main purpose of this invention to provide a crab cracking and cutting device which will have a knurled base member for positioning seafood thereupon, while a raised portion of the base pivotably secures a bar member having a handle for urging the toothed cracking portion downwards upon the shell of the crabs.

Another object of this invention is to provide a crab cracking cutting device which will have a cutting blade fashioned within the pivotable bar, the cutting blade being in alignment with the cracking portion of the device and the blade serving to sever portions of the crab.

A further object of the present invention is to provide a device of the heretofore described type which may be placed in any convenient location in order for the user to easily sever and crack portions of the crab in order to extract the meat completely therefrom for eating or other purposes.

Other objects of the present invention are to provide a crab cracking and cutting device which is simple in design, inexpensive to manufacture, rugged in construction, easy to use and efficient in operation.

These and other objects will be readily evident upon a study of the following specification and the accompanying drawing wherein.

Figure 3:
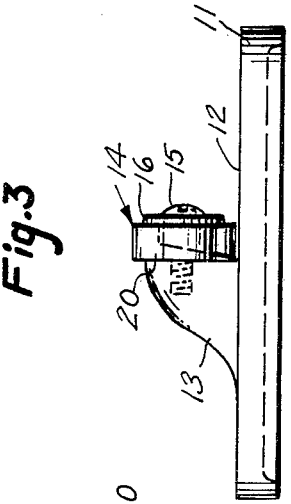
FIGURE 3 is an end view of FIG. 1.
Figure 1:
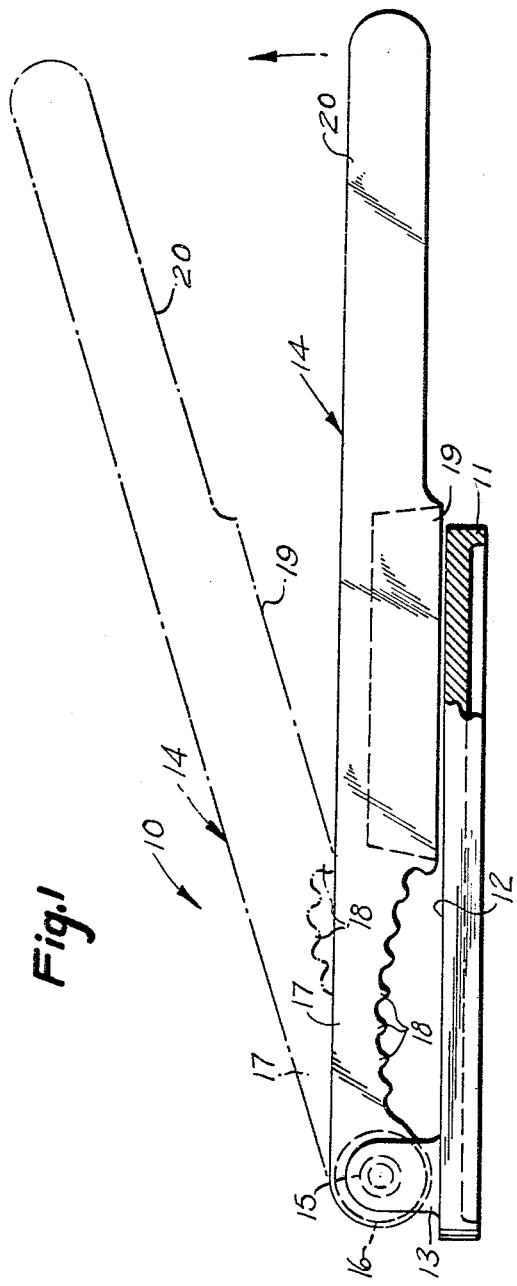
FIGURE 1 is a side view of the present invention shown partly broken away.
Figure 2:
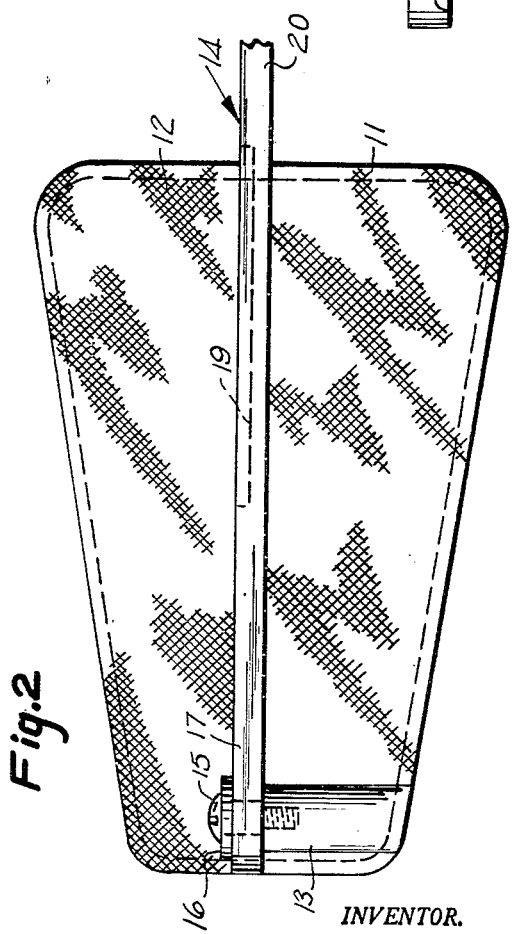
FIGURE 2 is a fragmentary top plan view of FIG. 1.

According to this invention, a crab cracking and cutting device 10 is provided with a flat aluminum base 11 which has a knurled surface 12 to prevent skidding of the shell when using device 10. A raised portion 13 of base 11 pivotably receives one end of an elongated bar member 14 which is attached to the raised portion 13 by a screw 15 threaded into the raised portion 13 with its head against a washer 16. Bar member 14 is provided adjacent to its pivotally attached end with an arcuously configurated portion 17 having a plurality of teeth 18 with which to engage and crack the shell of the crab. Bar 14 is also provided with a cutting blade 19 which is in alignment with the cracking portion 17, and the opposite free end of bar member 14 is provided with an extending handle 20 for gripping with the hands in order to pivot the bar member 14 during a cracking or cutting operation.

In use, the crab is cleaned of the outer appendages and all of the claws are broken from the crab's body. The big claw is placed upon the knurled surface 12 of base 11 beneath the cracking portion 17 of bar member 14 and the handle 20 is grasped by the user and pivots the cracking portion 17 down to contact the shell of the crab which with pressure will crack the shell completely across. The broken shell pieces are removed and thus the meat may be easily eaten. The small claws from which meat is hard to extract are then placed upon the base 11 beneath the cutting blade 19 of bar 14. By pivoting bar 14 downwards the cutting blade 19 is used to cut off the knuckle portion of the claw, after which the small claw may be placed in the mouth of the user and the meat squeezed therefrom (on soft shelled crabs).

The crab body is then placed under the knife blade 19 and is cut in half, after which the other half, or one of the halves is placed lengthwise under blade 19 and is cut in half again. This cutting process is then used on the other half of the crab thus producing four quarters of the body of the crab from which all the meat may be extracted and eaten, leaving none left in the body or claws.

It will be noted the device 10 may be used for lobster by using the blade 19 to cut off the tail section, while still using the blade 19 the tail portion of the lobster may be cut lengthwise and all of the meat is then exposed so that it may be readily eaten.

It shall further be noted that during the cracking and cutting of shelled seafood, the shells do not scatter about.

What I now claim is:

1. A shellfish cracking and cutting device comprising an elongated base member having a knurled upper surface, an elongated bar member having one end pivotally supported adjacent one end of said base member, said bar member having along one of its longitudinal edges a cracking portion and a cutting portion, the other end of said bar member constituting a handle portion whereby the bar member may be pivoted toward and away from said base member, said cracking portion being positioned closely adjacent the pivot support and being arcuate in shape.

2. The combination of claim 1 wherein said cracking portion is provided with a plurality of teeth for engaging with and cracking the shellfish.

3. The combination of claim 1 wherein said base member is provided with a raised portion and said pivot support constitutes a suitable fastener engaged in said raised portion.

References Cited

UNITED STATES PATENTS

| | | | |
|---|---|---|---|
| 888,738 | 5/1908 | Proctor | 146—13 |
| 2,136,816 | 11/1938 | Frazier | 17—9 |
| 2,335,806 | 11/1943 | Sjostrom | 17—2 |
| 2,527,018 | 10/1950 | Luzzi | 146—146 |
| 2,738,546 | 3/1956 | Gaetti et al. | 17—9 |
| 2,822,845 | 2/1958 | Medlin | 146—146 |

LUCIE H. LAUDENSLAGER, Primary Examiner

U.S. Cl. X.R.

17—75; 146—13, 146